United States Patent [19]

Gerson et al.

[11] 4,064,053
[45] Dec. 20, 1977

[54] STRAINER IMPROVEMENT

[75] Inventors: Ronald L. Gerson, Newton; Lawrence A. Caprio, Whitman, both of Mass.

[73] Assignee: Louis M. Gerson Co., Inc., Middleboro, Mass.

[21] Appl. No.: 747,943

[22] Filed: Dec. 6, 1976

[51] Int. Cl.$^2$ .............................................. B01D 39/08
[52] U.S. Cl. ................................ 210/497 FB; 55/521
[58] Field of Search ................ 55/521; 156/265, 514; 210/497 FB; 229/1.5 B

[56] References Cited
U.S. PATENT DOCUMENTS

| 752,019 | 2/1904 | Adwen | 210/497 FB |
| 2,187,769 | 1/1940 | Carew | 229/1.5 B |
| 3,567,033 | 3/1971 | Whelan | 210/497 FB |
| 3,738,889 | 6/1973 | Whelan | 55/521 X |
| 3,741,397 | 6/1973 | Gerson et al. | 210/497 FB |

Primary Examiner—Frank A. Spear, Jr.
Assistant Examiner—Richard W. Burks
Attorney, Agent, or Firm—Wolf, Greenfield & Sacks

[57] ABSTRACT

A strainer blank comprises a flat sheet having a plurality of cutouts including a cutout adapted to define a strainer portion at the apex of a cone formed from the blank. Strainer material positioned over the cutouts defines a convex rear end at the apex which is folded during formation of the conical strainer to form a multiply elongated seam which adds strength and provides a surface area for adhesively uniting the strainer material.

4 Claims, 3 Drawing Figures

STRAINER IMPROVEMENT

BACKGROUND OF THE INVENTION

A wide variety of disposable filters or strainers are known for use in various industries. The assignee of this application has long been in the paint strainer business and used disposable strainers in the past of the type illustrated in U.S. Pat. Nos. Des. 208,488, Des. 208,936 and U.S. Pat. No. 3,741,397. The type of disposable strainer disclosed in those patents comprises a strainer body having an apex and defining a plurality of cutouts which are covered by a straining screen which enables straining through a lower portion of the body with support provided by a thin conical body wall. Such strainers in the past have had apexes formed of the body wall with the cutouts being positioned upwardly of the apex probably because it was thought that the additional strength was needed at the apex. On the other hand, strainers for tea and other purposes have been disclosed as in U.S. Pat. No. 752,019 with apex portions formed of strainer material.

There is some difficulty in forming the strainer material in paint strainers with the strainer material at the apex and having sufficient strength to withstand normal usage as in paint straining where heavy viscous materials are processed.

The high speed manufacture of such strainers requires that the body blank and the strainer filter or screen material be positioned at high speed with minimum waste of material. There is some difficulty in folding strainer blanks with apex filtering material while providing a sufficient joint area to maintain the structural strength of the apex filter material. This is due in some part to the fact that the filter material when folded on itself and glued is difficult to adhere. Maximized lengths of seams and overlapped areas should be used in order to provide for good bonding.

SUMMARY OF THE INVENTION

It is an object of this invention to provide an improved strainer blank for forming a strainer which is mechanically strong and has good straining properties.

Still another object of this invention is to provide a strainer blank in accordance with the preceding object which can be manufactured at high speed in an efficient manufacturing procedure.

Still another object of this invention is to provide a paint strainer which has a straining material at an apex with the straining material being folded over itself at an enlarged joint area to maximize adherence of the plies under heavy load.

According to the invention a paint strainer blank has a flat sheet body with a first and second end and is configured to be folded into a generally conical strainer shape. The sheet body defines a plurality of cutouts including a cutout opening at the second end which in turn defines an apex portion of the conical shape. A one-piece filter material overlies the sheet and covers the cutouts being adhered to marginal portions around the cutouts. The filter material has a first end and a second end, corresponding to the first and second ends of the sheet body, with the second end of the filter material defining a convex extension edge extending from the second end at the apex portion and a corresponding concave portion at the material's first end. The convex extension is a means of providing extra material at the apex so that when the blank is rolled into a conical filter shape with the ends of overlapping portions of the second end overlapped and adhered together, a strong filter joint is formed at the apex. This joint has maximized area because of the convex portion. This area is the most difficult area to adhere because it is difficult to adhere straining or filter sheet materials upon themselves and thus maximized area is desirable to provide greater strength. Moreover, the maximized area provides greatest rigidity aided by the adhesive material used.

It is a feature of this invention that the convex rear portion of the filter material is cut from the leading edge of the web and would otherwise be wasted material since that leading edge normally overlies an imperforate portion of the filter. Thus maximized joint filter area is obtained without the need for additional filter material over what would otherwise be used. Still another feature of the invention resides in the ability of the filters of this invention to be produced at high speed in conventional high speed equipment. Even if the cloth is slightly out of place as may occur in high speed manufacture, sufficient extra material is provided by the convex edge to assure a strong seam joint. Minimized waste filter material is obtained. The filters can be made rapidly and efficiently. The filters with the strainer at the apex portion are highly efficient since straining of paint occurs at the apex end of the filter whereas in prior art filters having solid apex portions, no straining occurred and some paint loss was inevitable.

BRIEF DESCRIPTION OF THE DRAWINGS

The above and other features, objects and advantages of the present invention will be better understood from a reading of the following specification in conjunction with the drawings in which.

DESCRIPTION OF PREFERRED EMBODIMENTS

Figure 1:
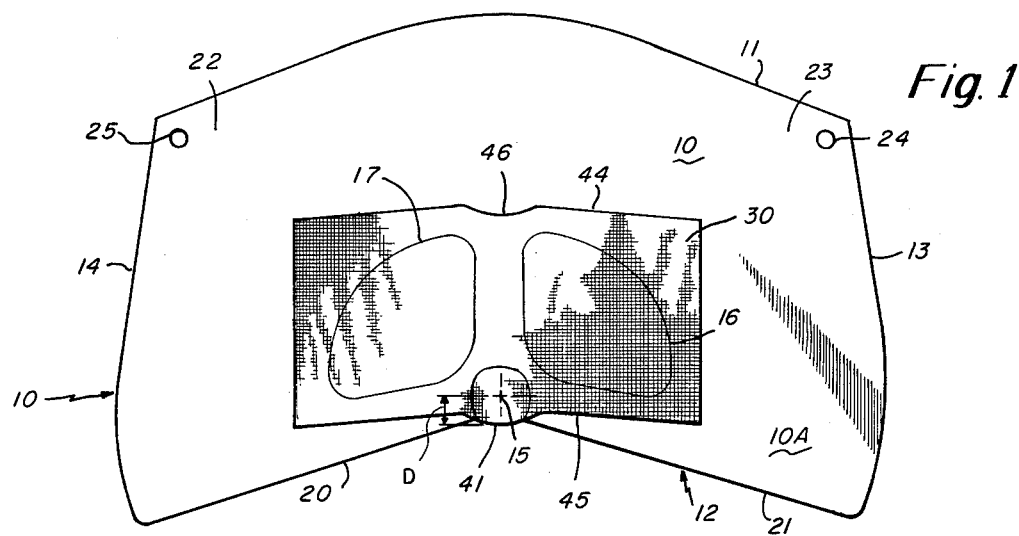
FIG. 1 is a top plan view of a blank in accordance with a preferred embodiment of this invention.

With reference now to the drawings the preferred embodiment of a blank for forming a disposable conical strainer of this invention is illustrated generally at 10 and has a sheet body 10A with a first convex leading edge 11, a second trailing substantially concave edge 12 between sides 13 and 14 together defining an apex point 15. Cutouts 16 and 17 are generally sector-shaped. The rear edge 12 is divided into two portions 20 and 21 which extend substantially from the apex outwardly to the edge formed by sides 13 and 14. The shape is preferably such that tab portions 22 and 23 with handling holes 24 and 25 are provided although filters without tab portions can be made if desired.

A filter material strip 30 in the form of a mesh blank, overlies and is glued to marginal edge portions of the body sheet material. The body 10A material is preferably formed of a thin imperforate sheet material and can be for example kraft board, sulphate board, coated or non-coated paper or other materials resistant to paint or other liquids to be filtered. The filter mesh material 30 can be any suitable screening material known in the art such as textile mesh of sufficient mesh size to filter the particulate material processed in any particular use. Synthetic, textile, metallic and other mesh materials can be used. The mesh sizes can vary according to the nature of the paint and the desired finish and can, for example, be in the range of from 32 × 28 threads/in. to 80 × 80 threads/in. as when cotton mesh is used.

The filter material 30 has a rearward extension which is convex as illustrated at 41. This extension is used in order to maximize the overlapped area denoted at 42 and increases the distance D from the apex points to the multi-ply portion edge of the filter material. When this distance is maximized, maximized surface area at folded portions 42 of the filter occurs. The folded portions are formed folding to the shape shown in FIGS. 2 and 3 with the area 42 indicating the folded over area. If the filter material trailing edge and leading edge were merely overall concave and convex respectively, the distanct D would be minimized as would area 42. Because the first and second edges 44, 45 are provided with the convex edge 41 with a corresponding concave portion 46, maximized strength can be obtained when folded into a blank. Portion 46 indicates the cutout portion which appears at 41. Thus the filter material blanks are cut from a single strip of material with no waste. The convex portion 41 need only cover substantially the diameter of the cutout for the apex filter mesh although it could cover a greater area. In the preferred embodiment, the concave edge 46 does not require use of additional filter mesh material since it lies substantially between cutouts 16 and 17. The filter material strips 30 can be cut and applied directly to the blanks 10 as when the blanks 10 are moving in standard production line techniques.

Folding into the final conical filter is accomplished by folding edge 21 over marginal portion 20 and adhering the seam from the apex tip 50 up to the upper edge 51 of the conical filter. Glues of the aqueous emulsion type such as polyvinylacetate and its copolymers with acrylics can be used. It is known that such glues have some difficulty in adhering the plies of folded portion 42 of filter material to each other. They must be adhered well or the filters will leak and their utility would be destroyed. By having a maximized overlapped area, good adherence can be obtained. Moreover, the maximized area further provides a somewhat rigidified doubled over portion which again adds mechanical strength and forms a rib of sorts at portion 42 which aids in supporting the paint or other material strained.

While the distance D may vary with different sized filters, it is preferred that that distance from the apex to the convex edge of the lower cutout be at least one-quarter inch to provide sufficient area and distance for gluing.

Figure 2:
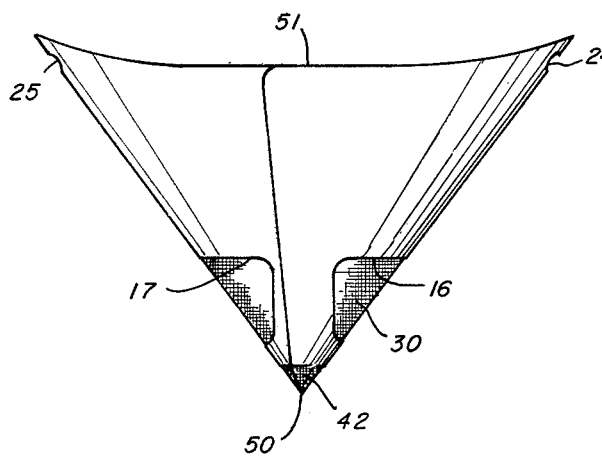
FIG. 2 is a front view of a filter blank of this invention formed into a conical filter.
Figure 3:
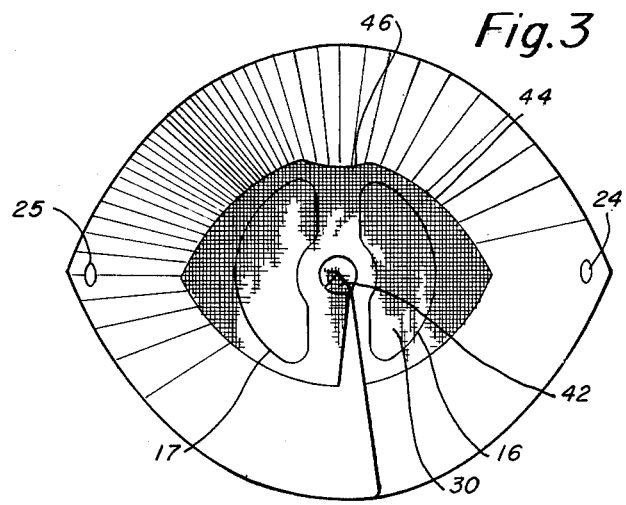
FIG. 3 is a top plan view thereof.

In a preferred embodiment of this invention, the conical filter of FIG. 2 has a diameter of approximately 6 inches. at edge 51 and the distance from the apex 50 to edge 51 is about five and one-quarter inches. The cutout portions 16 and 17 define areas of 3-3/10 square inches each and the apex filter portion is generally conical with an area of 3/10 square inches and an overlapped, multi-ply area 42 of 1/10 square inch. Preferably the ratio of area 42 to the area of the conical apex filter mesh material is at least one to three.

It should be understood that any number of cutout portions may be used as desired. The main feature of the invention here is the use of an apex filter which enables maximized straining without wastage of material and with sufficient mechanical strength to enable straining under severe conditions of use as in paint straining and the like. Although the apex filter portion is generally conical, the upper edge of the filter material can be circular as in the preferred embodiment, star-shaped or have irregular shaped as may be desired for particular applications.

We claim:

1. A paint strainer blank comprising
a flat sheet body having a first end, a second end and configured to be folded into a generally conical strainer shape,
said sheet body defining a plurality of cutouts including a cutout opening defined by said second end which forms a truncated portion of the conically folded sheet to define an apex portion of said generally conical strainer shape,
a one-piece filter material overlying said flat sheet and covering said cutouts while being adhered to marginal portions thereof to form filter areas including a conical filter area at said apex portion,
said material having a first end and a second end with said material second end defining a convex extension edge extending from said material second end at said apex portion and a corresponding concave portion at said material first end.

2. A paint strainer blank in accordance with claim 1 folded into said conical shape with a first portion of said sheet body second end overlapping a second portion of said sheet body second end and said convex extension edge being folded on itself at the apex portion and adhered to form a plural layered reinforced portion of a strainer at said apex portion.

3. A paint strainer blank in accordance with claim 2 wherein said convex extension edge and corresponding concave portion are of equal size and curvature.

4. A paint strainer blank in accordance with claim 3 wherein said convex extension edge extends beyond said sheet body second end and said sheet body is formed of a substantially paint impervious paper material.

* * * * *